United States Patent [19]

Starr

[11] 4,385,909
[45] May 31, 1983

[54] DE-AERATOR FOR HYDRAULIC POWER UNITS

[75] Inventor: Louis Starr, Birmingham, Mich.

[73] Assignee: Starr Hydraulic-Electro Controls Co., Warren, Mich.

[21] Appl. No.: 297,656

[22] Filed: Aug. 31, 1981

[51] Int. Cl.³ .............................................. B01D 19/00
[52] U.S. Cl. .......................................... 55/55; 55/189; 210/188
[58] Field of Search ...................... 55/48, 55, 160, 182, 55/189; 210/188

[56] References Cited

U.S. PATENT DOCUMENTS

| 377,099 | 1/1888 | Fowler | 55/189 |
|---|---|---|---|
| 1,036,806 | 8/1912 | Desmaroux | 55/55 X |
| 2,413,102 | 12/1946 | Ebert et al. | 55/55 X |
| 2,768,704 | 10/1956 | Cronkhite | 55/178 |
| 2,927,658 | 3/1960 | Slater, Jr. | 55/189 |
| 2,995,147 | 8/1961 | Bergquist | 137/475 |
| 3,154,087 | 10/1964 | Beaver | 55/55 X |
| 3,193,988 | 7/1965 | Kudlaty | 55/160 |
| 3,357,161 | 12/1967 | Starr et al. | 55/189 |
| 3,538,682 | 11/1970 | Chattin et al. | 55/55 X |
| 3,991,568 | 11/1976 | Latimer et al. | 60/327 |
| 4,322,226 | 3/1982 | Hudec | 55/55 X |

FOREIGN PATENT DOCUMENTS

| 681089 | 8/1939 | Fed. Rep. of Germany . |
| 55-094605 | 7/1980 | Japan | 55/55 |
| 151136 | 9/1920 | United Kingdom . |

Primary Examiner—Robert H. Spitzer
Attorney, Agent, or Firm—Krass, Young & Schivley

[57] ABSTRACT

Provision is made for removing gaseous impurities, such as air, from hydraulic fluid in a hydraulic power system. A sump tank serves as a reservoir for the hydraulic fluid which passes through the power unit in a closed loop manner. The fluid inlet and outlet lines are connected to the tank below the level of hydraulic fluid therein. A source of vacuum is connected to the tank above the fluid level for removing impurities from the fluid. In a preferred embodiment, a flexible member is used to adjust the volume of the evacuated area of the tank as a function of the pressure in the tank space above the fluid level. The tank may further include one or more adjustable expandable devices which are used to regulate the fluid pressure within the system as desired.

10 Claims, 4 Drawing Figures

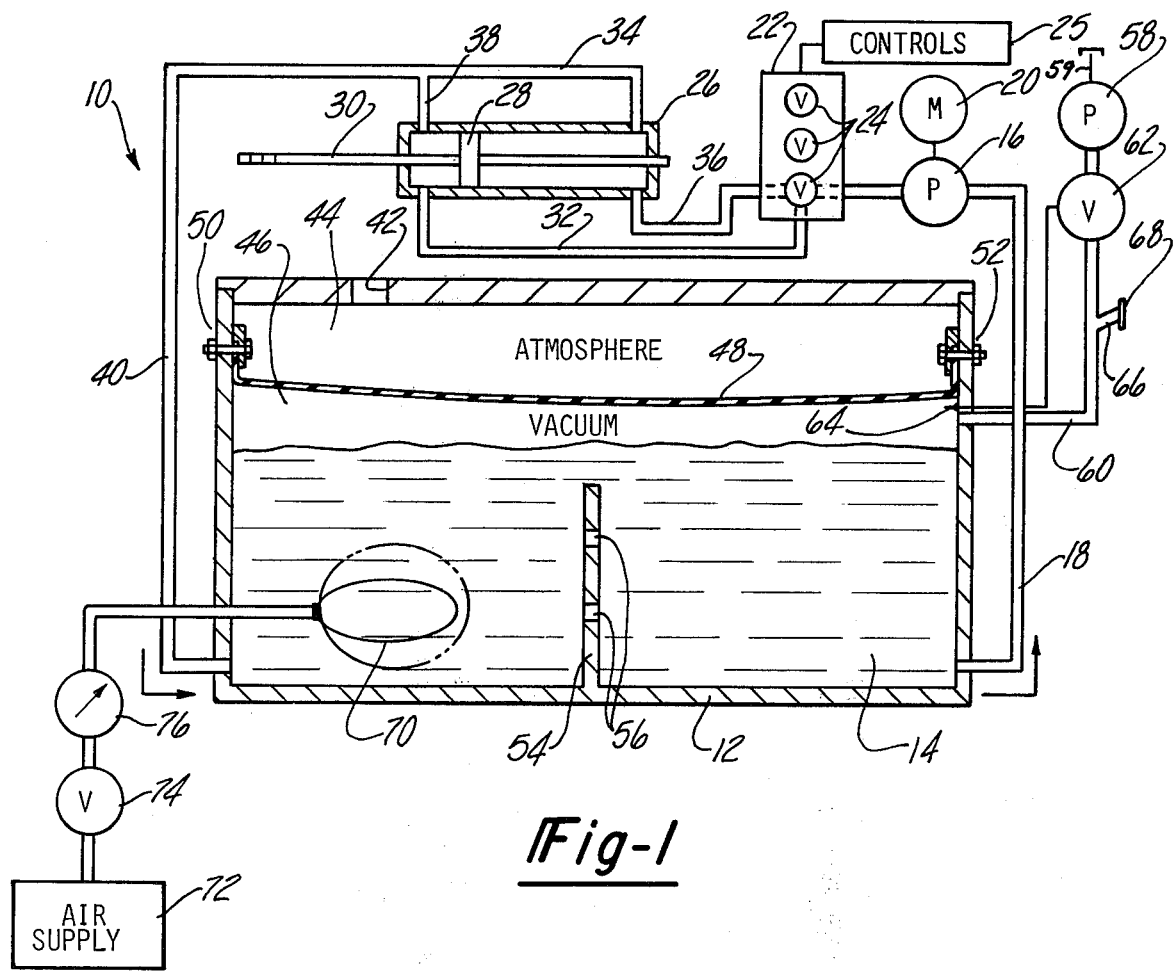
*Fig-1*
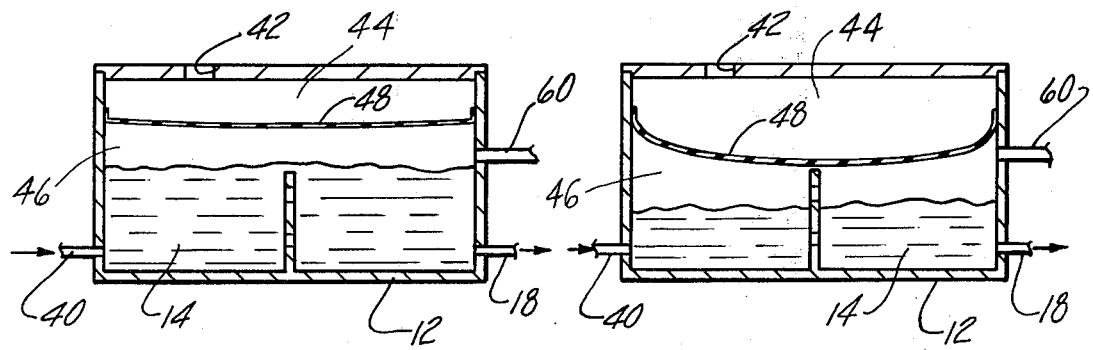
*Fig-2a*  *Fig-2b*

DE-AERATOR FOR HYDRAULIC POWER UNITS

TECHNICAL FIELD

This invention relates to hydraulic power units and, more particularly, to devices for removing gaseous impurities from hydraulic fluids used in such units.

BACKGROUND ART

Hydraulic power units are widely used in a variety of manufacturing applications. These hydraulic power units include a hydraulic reservoir sump tank which serves as a receptacle for holding hydraulic fluids such as well known petroleum based oils. These hydraulic units are closed looped systems in which fluid is pumped from the tank, generally by an electrically operated hydraulic pump and supplied to one or more valves in a valve deck. The outputs of these valves are connected to various hydraulicly energized devices such as cylinders with pistons therein which move in accordance with the amount of hydraulic fluid applied to one side or the other of a piston head therein. Fluid in the non-pressurized side of the hydraulic cylinder is forced out of the cylinder. In conventional hydraulic power units, the outlet lines from the hydraulic cylinders or other devices are connected to return lines for carrying the fluid back to the tank. These return lines have in the past merely passed through comparatively large holes in the top of the sump tank. Consequently, the entire interior of the tank was open to atmospheric pressure.

It is known that conventionally used hydraulic fluids may contain a certain amount of gaseous impurities. For example, it is common to find an appreciable amount of air in petroleum oils. These gaseous impurities can affect the accuracy of the hydraulic positioning devices operating under control of the pressurized fluid. If the hydraulic fluid is not completely homogeneous, but contains dissolved air therein, the system response will be affected since the impurities in the fluid cause it to be somewhat compressible or "spongy". In sophisticated, finely tuned hydraulic systems such as in robotic applications, it is imperative that the hydraulic fluid be non-compressible and free from impurities so that the accuracy of the positioning devices will not be impaired.

The prior art recognizes that subjecting hydraulic fluid to a vacuum will serve to draw off the impurities therein. See, for example, U.S. Pat. No. 3,357,161 to Starr et al., and U.S. Pat. No. 3,193,988 to Kudlaty. However, the apparatus employed in these and other prior art systems do not lend themselves to incorporation into hydraulic power units of the type described above which use sump tanks as reservoirs for the hydraulic fluid in the system.

SUMMARY OF THE INVENTION

It is the primary object of this invention to provide a means by which gaseous impurities can be efficiently removed from fluids used in conventional hydraulic power units. It is a further object of this invention to provide this capability with a minimum amount of modifications to existing apparatus used in such units. According to the broad teachings of this invention, the tank is sealed and the fluid lines are routed into and out of the sealed portion of the tank. A vacuum is drawn above the fluid level in the tank which serves to remove the gaseous impurities in the fluid and exhaust them into the atmosphere.

In the preferred embodiment means are provided for sealing off a lower compartment of the tank. The return lines are routed into the sealed off compartment of the tank and the vacuum is created in the compartment above the fluid level. Means are provided for adjusting the volume of the evacuated area of the tank as a function of pressure therein. The pressure in the tank can be effected by such things as changes in the fluid level. By keeping the volume of the evacuated compartment relatively constant despite such fluctuations the overall fluid pressure within the closed loop system can be accurately maintained. Preferably, a flexible diaphragm is utilized to divide the tank into an upper portion which is exposed to atmospheric pressure and a lower compartment which is evacuated. The diaphragm expands and contracts as a function of the pressure differential between the atmosphere and the evacuated area in the tank to thereby maintain a relatively constant volume in this area. The motion of the diaphram also tends to prevent vapor lock from occuring.

In an alternative embodiment, at least one bellows in the tank is used which extends into an evacuated area of the tank containing the hydraulic fluid. The lower end of the bellows is sealed while its interior is exposed to atmospheric air. The bellows thus, likewise, expands or contracts as a function of the pressure within the sealed area of the tank.

A feature of this invention includes the provision of an externally adjustable expandable device in the sealed area of the tank. By expanding or contracting this device the fluid pressure within the system can be regulated to a desired level thereby enhancing the function of the pump.

BRIEF DESCRIPTION OF THE DRAWINGS

These and other objects and advantages of the present invention will become apparent to one skilled in the art upon reading the following specification and by reference to the drawings in which:

FIG. 1 is a cross-sectional view of a hydraulic power unit incorporating one embodiment of the present invention;

FIGS. 2(A-B) are cross-sectional views of the tank shown in FIG. 1 at different fluid levels.

DESCRIPTION OF THE PREFERRED EMBODIMENT

Figure 3:
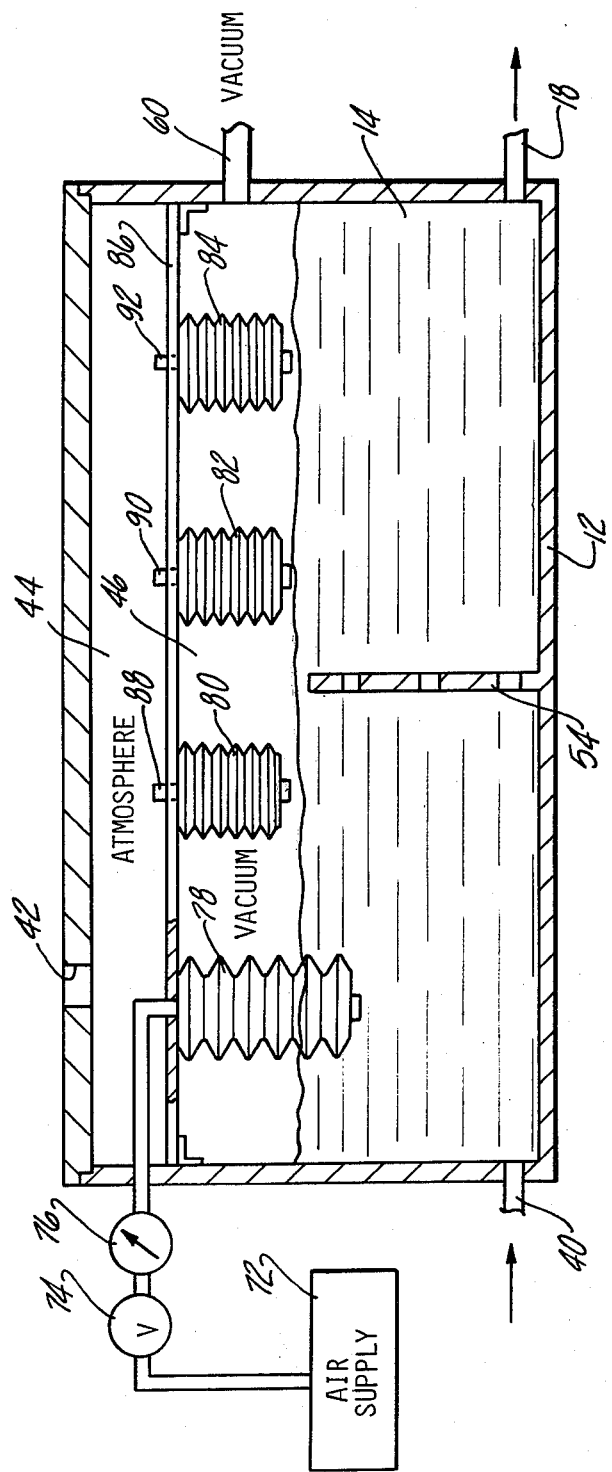
FIG. 3 is a cross-sectional view of an alternative embodiment of the present invention which may be used in connection with the hydraulic power unit in FIG. 1.

FIG. 1 schematically illustrates a hydraulic power unit 10 which incorporates the present invention. Unit 10 includes a sump tank 12 serving as a reservoir for hydraulic fluid 14. Hydraulic fluid 14 may be a wide variety of fluids which are commonly used in hydraulic power systems. The present invention finds particular utility for removing air and other gases from petroleum oils.

Hydraulic fluid is removed from tank 12 by way of pump 16 communicating with outlet line 18 which is connected to the lower portion of tank 14. Pump 16 is an electrically operated hydraulic pump driven by electric motor 20. The output of pump 16 is connected to a valve deck 22 containing a plurality of three way valves 24. The operation of valves 24 is controlled by a suitable control device 25.

The two outlet lines 32,36 from each valve 24 are connected to a hydraulically operated positioning device such as cylinder 26. While the drawings show only one cylinder 26, those skilled in the art will recognize that several such cylinders may be used which are, in turn, controlled by selected ones of the valves 24 in valve deck 22. Additionally, valve deck 22 may be used to control the operation of hydraulic motors, actuators, servo-mechanisms, and other hydraulic components.

Cylinder 26 includes a piston head 28 which controls the motion of an associated piston rod 30. The end of piston rod 30 can be connected to a number of different devices to control a wide variety of applications. For example, piston rod 30 can be connected to an arm of a mechanical robot which is used to perform a given function in an automated assembly process. If valve 24 is positioned so that fluid flows through line 32, piston head 28 will move rightwardly forcing any remaining fluid within the right hand portion of the cylinder into outlet line 34. Conversely, if pressurized fluid is delivered by valve 24 through line 36, piston head 28 will move leftwardly forcing the fluid in the left hand chamber into outlet line 38. Outlet lines 34 and 38 are connected to a single return line 40.

The hydraulic system 10 thus far described is conventional and thus need not be described in any more detail. In the past, return line 40 merely passed through an opening 42 in the top of tank 12 to deliver fluid 14 into tank 12. The clearance between return line 40 and opening 42 was such that the interior portion of tank 12 was open to atmospheric pressure.

According to the present invention tank 12 is divided into an upper portion 44 and a sealed lower compartment 46. In the embodiment shown in FIG. 1 this is accomplished by way of a flexible rubber diaphragm 48 which is connected along the edges of tank 12 in a sealed manner. Diaphragm 48 can be made of any suitable gas impervious material such as rubber. Likewise, diaphragm 48 can be connected in an air tight manner to tank 12 by a variety of methods, for example, by way of clamps 50 and 52 shown in FIG. 1.

Tank 12 may also be provided with a standard baffle 54 having a plurality of spaced holes 56 therein. Pursuant to the present invention return line 40 is connected to the lower side portion of tank 12 such that fluid 14 is introduced into the lower left hand portion of compartment 46 and exits by way of outlet line 18 on the opposite lower side of tank 14. Baffle 54 provides a dam effect which allows any heavy impurities in fluid 14 to settle to the lower left bottom of the tank where they can be removed by way of suitable drains (not shown).

Gaseous impurites in fluid 14 are removed by evacuating the sealed lower compartment 46 which serves to draw off any air bubbles or other gaseous impurities in fluid 14. A vacuum pump 58 communicates with a conduit 60 which is connected to the upper portion of compartment 46. A shut off valve 62 is located in conduit 60 between pump 58 and the tank 12. The pressure in compartment 46 may be detected by a suitable pressure sensor 64 whose output may be used to control the operation of pump 58. Conduit 60 may also be provided with an oil fill line connection 66 so that new hydraulic fluid may be added to the system when desired. A conventional sight gauge in the side of the tank is generally employed so that the user can see the fluid level in the tank. Connection 66 includes a suitable cap 68 for sealing off this opening to conduit 60 during normal operation.

The extent of the vacuum created in compartment 46 can be adjusted depending upon the type of hydraulic fluid 14 being utilized by the system and the types of gaseous impurities normally found in that particular type of fluid. While automated control of the vacuum system is contemplated, it is not necessary to carry out the broadest aspects of the invention. All that is important is that sufficient vacuum be created in compartment 46 to remove the gasoues impurities from fluid 14. The gaseous impurities are vented into the atmosphere through an exhaust port 59 in pump 58. It is, however, preferable to energize pump 58 only intermittently so as to preserve wear on the pump and to prevent removal of desirable additives in fluid 14 which may have a fairly high vapor pressure.

In addition to forming sealed compartment 46, diaphragm 48 operates to continually adjust the volume of compartment 46 as a function of the pressure differential between the atmospheric air in the tank upper portion 44 and the sealed evacuated lower compartment 46. The volumetric pressure of the air space within compartment 46 will depend upon such factors as the operational cycle of vacuum pump 58, the level of fluid 14 within tank 12, and the amount of vaporized gases which eminate from fluid 14. If, for example, the fluid level within tank 12 decreases, then the pressure in the air space above the fluid level will decrease assuming the other variables are constant. FIG. 2 shows the operation of diaphragm 48 in such instances. In FIG. 2A the fluid level 14 is relatively high and thus the diaphragm 48 is not substantially bowed. However, if the fluid level decreases such as shown in FIG. 2B, the pressure differential on diaphragm 48 will increase causing it to extend downwardly thereby decreasing the total volume of the sealed compartment 46 but keeping the volume of the air space above fluid 14 relatively constant. This operation serves to maintain a relatively constant volumetric pressure within sealed compartment 46. In such manner, pump 16 will not experience great fluctuations in the back pressure or head of fluid 14 when pumping it from tank 12. In addition, the movement of diaphragm 48 prevents air locks which could impede fluid flow in the system. Also, by keeping the air space volume continually relatively small the vacuum pump 58 need not be used as much.

An optional feature of this invention includes an expandable device in the sealed area of the tank which operates to regulate the fluid pressure within the closed loop system as desired. In FIG. 1, this expandable means takes the form of an inflatable bladder 70 which is connected to an air supply 72 through a valve 74 and an air pressure meter 76. If it is desired to increase the fluid pressure the user opens valve 74 to introduce air into bladder 70 to a given pressure as determined by meter 76. The introduction of the additional volume produced by bladder 70 within the closed loop fluid system serves to increase the fluid pressure therein. In such manner, the fluid pressure may be regulated as desired by expanding or contracting bladder 70.

FIG. 3 shows an alternative embodiment of the present invention. The embodiment shown in FIG. 3 is susbstantially the same as that described in connection with FIG. 1, except as described below. Thus, the same reference numerals will be used to designate common elements. In this embodiment diaphragm 48 is replaced by a series of bellows 78-84. Bellows 78-84 are hollow accordian-like devices which are sealed at their lower ends. Bellows 78–84 depend from a solid plate 86 which divides tank 12 into upper portion 44 which is exposed to atmospheric pressure and lower sealed compartment 46 which is evacuated. The interior portions of bellows 80–84 are exposed to atmospheric pressure by way of inlets 88–92, respectively, which pass through plate 86 into upper portion 44. Consequently, bellows 80–84 will expand and contract as a function of the pressure in evacuated compartment 46 thereby serving the same function as diaphragm 48.

Bellows 78 similarly serves the same function as bladder 70 in the embodiment of FIG. 1. The interior of bellows 78 communicates with air supply 72. The degree to which bellows 78 is expanded is regulated by valve 74, to thereby adjust the fluid pressure within the system.

In view of the foregoing it can now be realized that the present invention provides an unique arrangement for removing air or other impurities from hydraulic fluids. The apparatus of the present invention requires very little modification of existing hydraulic power systems and thus can be implemented at low cost. While two embodiments of the present invention have been described, other modifications will become apparent to one skilled in the art after a study of the specification, drawings and claims.

I claim:

1. A method of modifying recirculating hydraulic power units so as to remove gaseous impurities from hydraulic fluid regularly circulating between hydraulic devices and a sump tank whose interior is exposed to atmospheric air, said method comprising:
   sealing off a lower portion of the tank;
   connecting inlet and outlet fluid lines between said hydraulic devices and the sealed tank portion;
   mounting a flexible device in the interior of the tank so that one side thereof is exposed to the pressure in the sealed tank portion, with an opposite side of the flexible device being continuously exposed to atmospheric air; and
   creating a substantially constant vacuum level in the sealed tank portion so as to remove gaseous impurities from the fluid circulating therethrough.

2. The method of claim 1 wherein at least one bellows is mounted in the sealed tank portion, with the interior of said bellows communicating with atmospheric air.

3. The method of claim 1 wherein said tank has an opening in top portions thereof and wherein a flexible diaphragm is used to divide the tank into an upper portion exposed to the atmosphere and a sealed lower portion.

4. The method of claim 1 which further comprises regulating the fluid pressure in the system by adjusting the size of an expandable device within the tank.

5. In a hydraulic power unit having at least one hydraulic device controlled by hydraulic fluid regularly circulating through a recirculating hydraulic system including a sump tank, the improvement comprising:
   means for forming a sealed portion in the tank;
   means for regularly circulating hydraulic fluid between the hydraulic device and the sealed tank portion during the operation of said device;
   vacuum means for continuously creating a vacuum in the sealed tank portion during operation of the device so as to continuously remove gaseous impurities from the circulating hydraulic fluid therein; and
   a flexible device in the sealed tank portion having one side thereof exposed to the vacuum and an opposite side thereof exposed to a generally fixed source of increased air pressure relative to the vacuum whereby said flexible device operates to move and automatically adjust the volume of the sealed tank portion due to changes in the pressure differential on opposite sides of the flexible device as the fluid circulates through the tank.

6. The apparatus of claim 5 which includes a flexible diaphragm in the tank for dividing same into an upper portion exposed to atmospheric pressure and said lower sealed portion.

7. The apparatus of claim 5 which includes at least one bellows in the tank extending into the sealed portion thereof, with the interior of said bellows communicating with atmospheric air.

8. The apparatus of claim 5 which further comprises adjustable expandable means in the sealed compartment of the tank for adjusting the fluid pressure.

9. The apparatus of claim 8 wherein said expandable means comprises a bladder and a regulated air supply for providing pressurized air into the bladder.

10. The apparatus of claim 8 wherein said expandable means comprises a bellows having its lower end extending into the sealed compartment and an upper end communicating with a regulated air supply for providing pressurized air into the bellows.

* * * * *